F. C. BLAIR.
AGRICULTURAL MACHINE.
APPLICATION FILED JAN. 24, 1914.

1,164,163.

Patented Dec. 14, 1915.
6 SHEETS—SHEET 1.

Witnesses
Robert M. Sutphen
A. I. Hind

Inventor
F.C. BLAIR

By Watson E. Coleman
Attorney

UNITED STATES PATENT OFFICE.

FRED C. BLAIR, OF KALISPELL, MONTANA.

AGRICULTURAL MACHINE.

1,164,163.  Specification of Letters Patent.  Patented Dec. 14, 1915.

Application filed January 24, 1914. Serial No. 814,209.

*To all whom it may concern:*

Be it known that I, FRED C. BLAIR, a citizen of the United States, residing at Kalispell, in the county of Flathead and State of Montana, have invented certain new and useful Improvements in Agricultural Machines, of which the following is a specification, reference being had to the accompanying drawings.

This invention relates to certain improvements in agricultural machines, and it is an object of the invention to provide a device of this general character of a novel and improved construction whereby the same is caused to operate with a maximum of efficiency and wherein the structure is effectively balanced.

It is also an object of the invention to provide a device of this general character having novel and improved means whereby the various parts thereof are motor-driven whereby the draft team is relieved of substantially all strain, other than the actual weight of the machine, and what may be created by the resistance offered in properly guiding the machine.

The invention also consists in the details of construction and in the combination and arrangement of the several parts of my improved agricultural machine, whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Resting upon the supporting shaft 1 intermediate the traction wheels 9 and capable of rocking movement thereupon is the main frame 14 of requisite dimensions and herein disclosed as including the spaced side sections 15—15 having their forward portions disposed on a downward incline, while the rear portions thereof are disposed in substantially horizontal planes, the inclined portions of the side members 15 being provided adjacent their upper ends with the bearing members 16, whereby the same may be properly connected with the shaft or axle 1. Projecting upwardly and forwardly from each of the side members 15 of the frame 14 are the substantially arcuate members 17 having their forward ends pivotally connected, as at 18, intermediately of the rear portion 19 of the tongue beam 20, such tongue beam being adapted for vertical adjustment, whereby the frame 14 may be raised or lowered as the occasion may require.

The forward end portion of the beam 20 is provided with the vertically disposed opening through which is adapted to be directed the vertically disposed post 22 adapted to provide a means whereby the forward portion of the device may be supported, such post having affixed thereto above and below the beam 20 the collars 23 whereby movement of the beam 20 longitudinally of such post may be controlled. As herein disclosed, the collars 23 are capable of adjustment lengthwise of such post 22 whereby the position of the beam 20 relative to the post may be regulated, as the necessities of practice may require.

The lower extremity of the post 22 is provided with the yoke 24, the extremities 25 of which are arranged to afford suitable spindles on which the front supporting wheels 26 may be mounted.

As disclosed in Figs. 1 to 4, I set forth an embodiment of my invention wherein draft animals are adapted to be employed and for this purpose the forward end of the tongue beam 20 is adapted to have suitably coupled thereto, as at 28, any desired form of draft rigging 29.

In order that the frame 14 may be raised or lowered, as desired, I pivotally connect with the rear extremities of the beam 20 the link 33 which is also in pivotal engagement with the lever 34 disposed above the beam 20 and in substantial parallelism therewith, the forward extremity of such lever being pivotally secured, as at 35, to the collar 36 loosely supported on the post 22 and maintained against endwise movement thereon through the medium of the collars 37 clamped to such post and to opposite sides of the collar 36 and with which such collar 36 is adapted to contact, as is believed to be self-evident. The opposite extremity of the lever 34 terminates in convenient proximity to the seat 38 operatively supported by the frame 14 and provided with the latch 39 adapted to coact with the vertically disposed segmental rack 40 supported by the arms 17 whereby it will be readily perceived that an effective means is afforded whereby the frame 14 may be locked in its different adjustments.

Figures 1, 5:
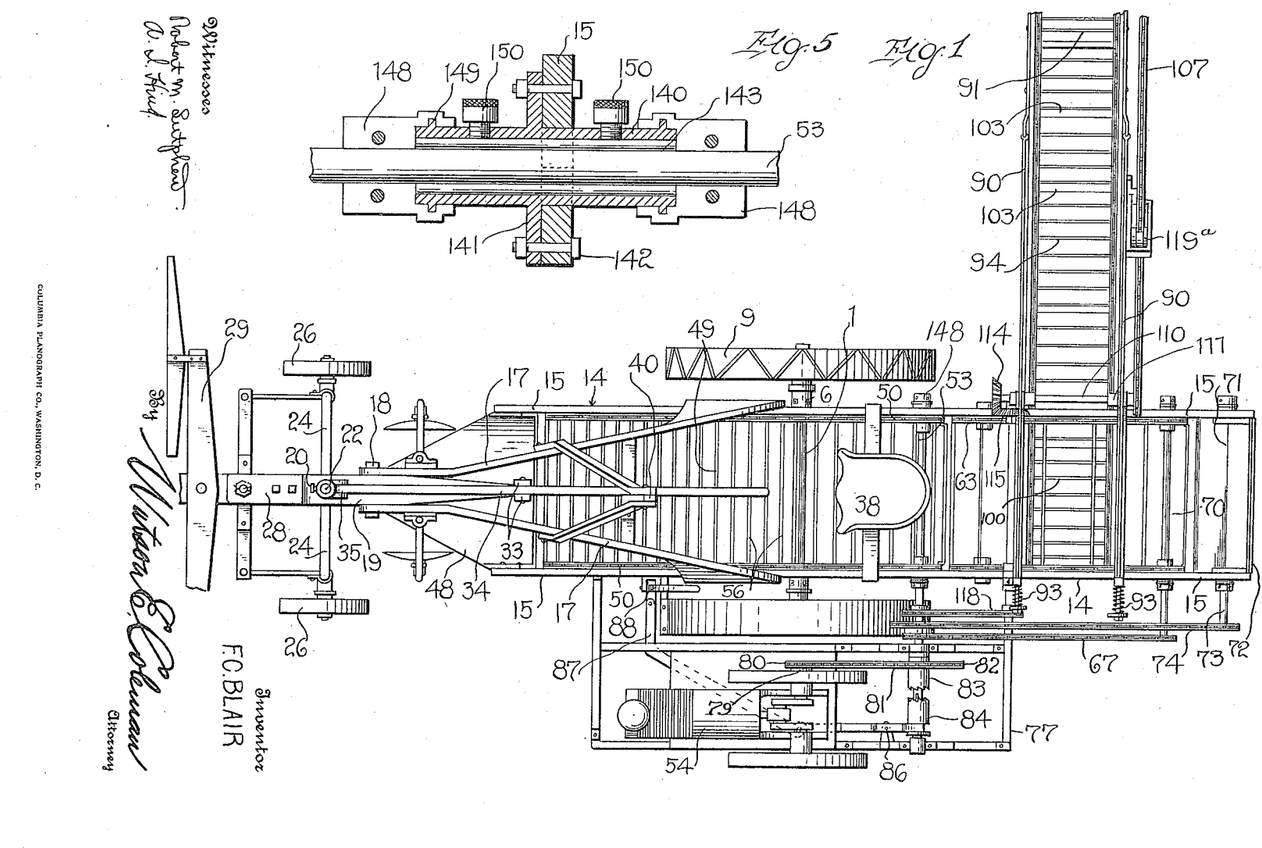
Figure 1 is a view in top plan of an agricultural machine constructed in accordance with an embodiment of my invention.
Fig. 5 is an enlarged sectional view illustrating the mounting of the main drive shaft of the machine, as herein set forth.
Figure 2:
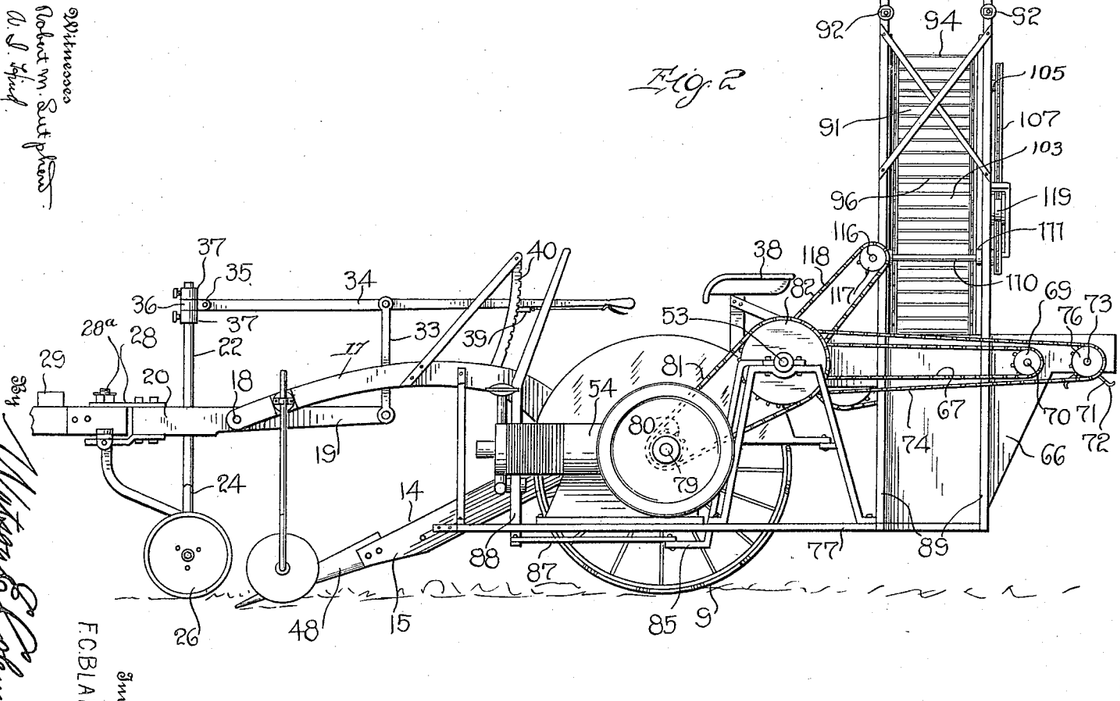
Fig. 2 is a view in side elevation of the device as illustrated in Fig. 1.
Figure 3:
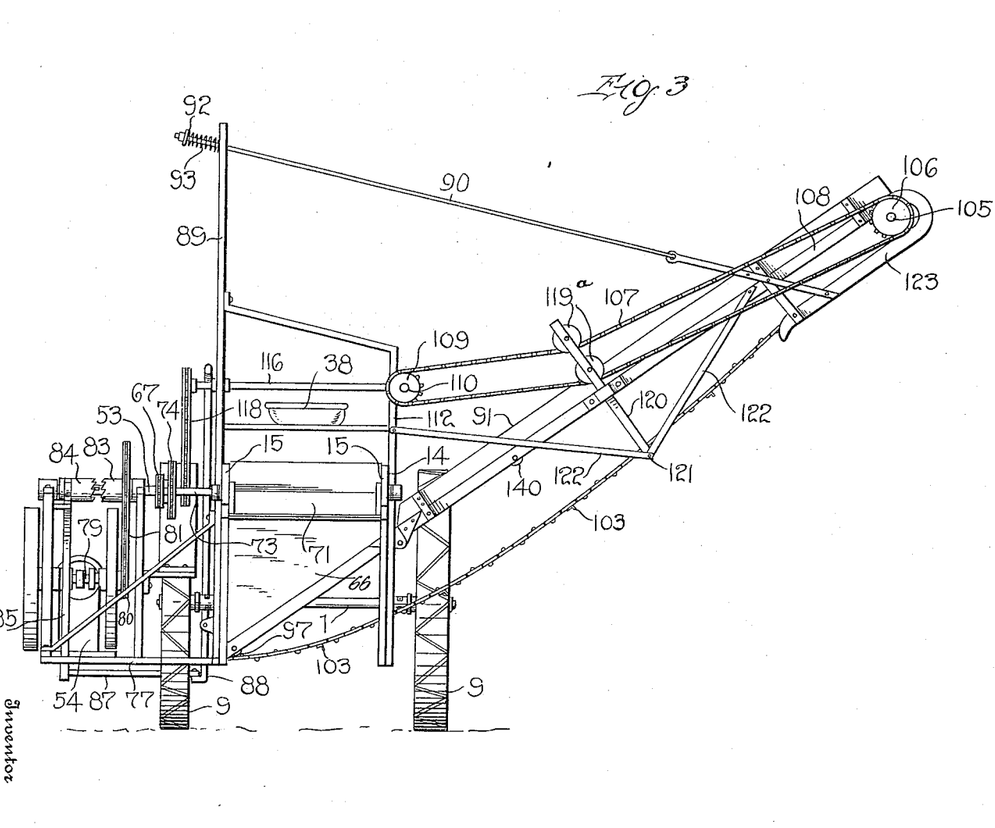
Fig. 3 is a view in rear elevation of the device as illustrated in the preceding figures.
Figure 4:
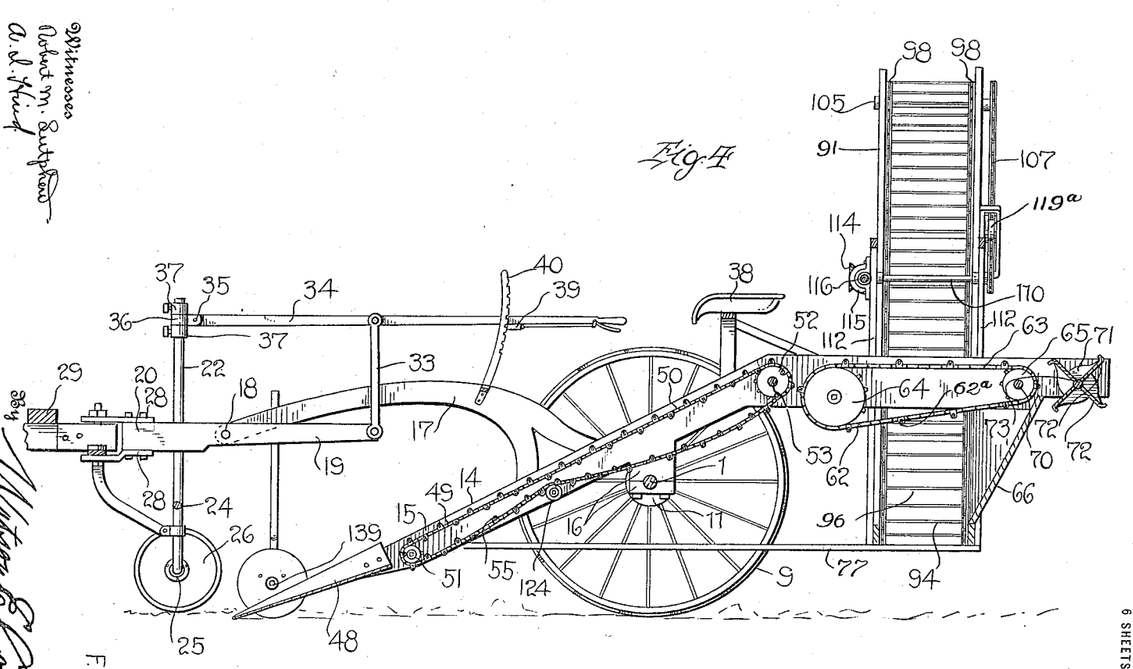
Fig. 4 is a substantially central longitudinal vertical sectional view taken through Fig. 1.
Figure 6:
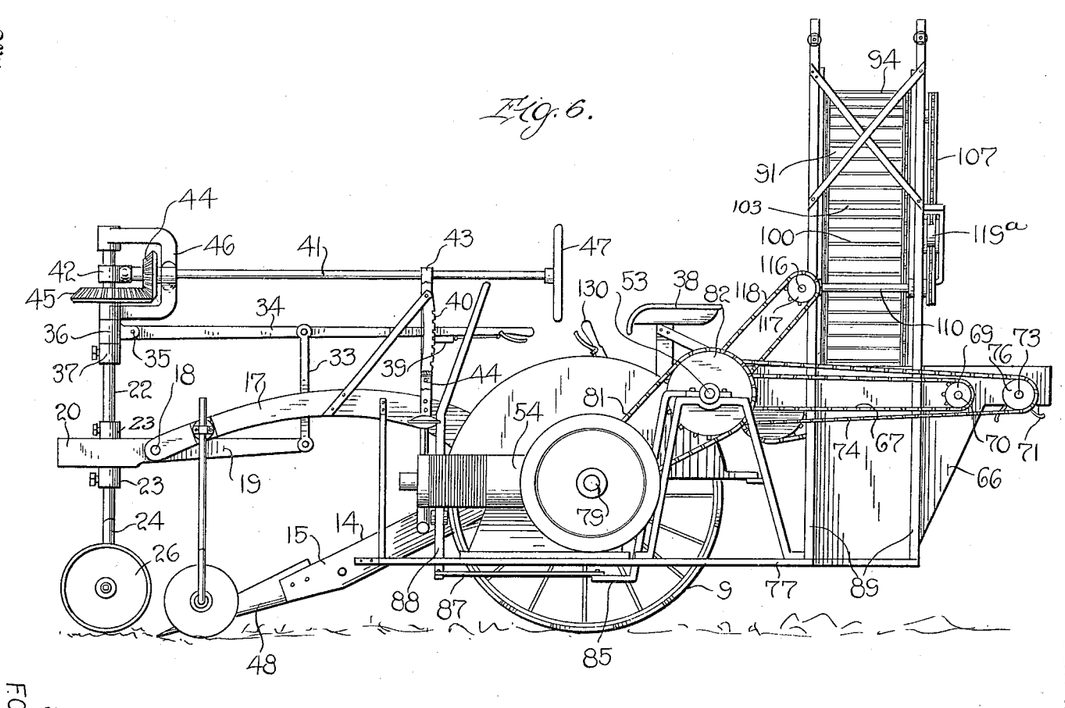
Fig. 6 is a view similar to Fig. 2 but illustrating a further embodiment of my invention.
Figure 7:
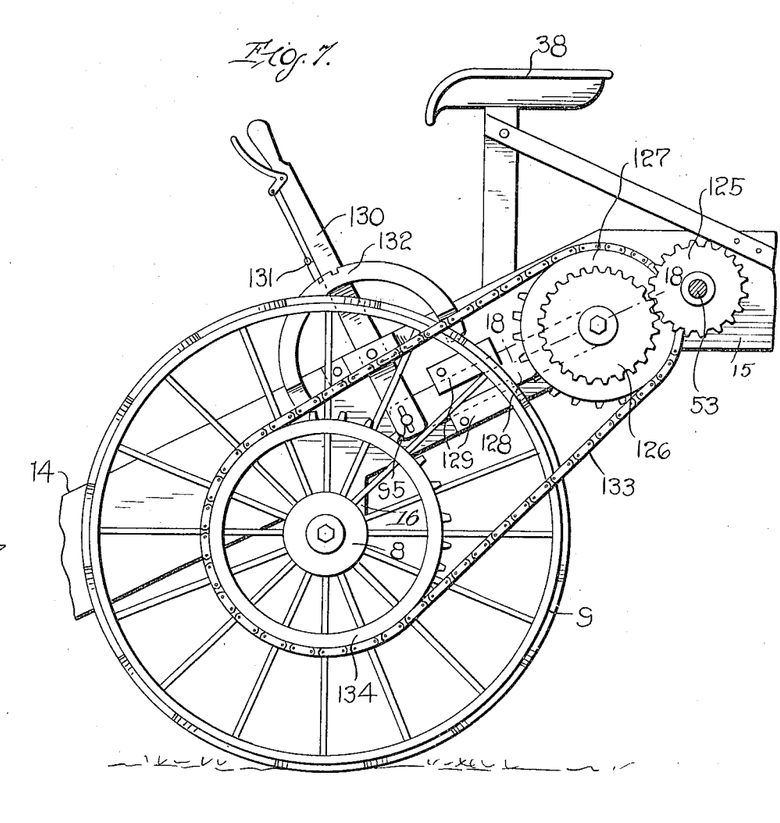
Fig. 7 is an enlarged fragmentary view in elevation of the drive connection with the traction wheels as embodied in the form of the invention illustrated in Fig. 6.
Figure 8:
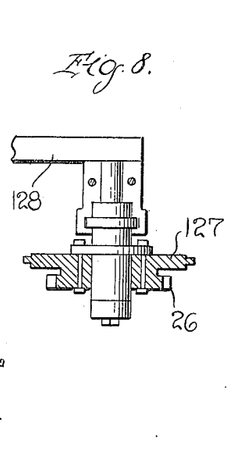
Fig. 8 is a sectional view taken substantially on the line 18—18 of Fig. 7.

When it should be desired that the machine be propelled by a motor as will hereinafter be more particularly referred to and as illustrated in Figs. 6 and 7, it is essential that mechanical means be employed whereby the requisite steering control may be had of the post 22 and, as herein disclosed, this is accomplished through the medium of the shaft 41 having one end portion in swiveled engagement with a collar 42 loosely mounted on the upper extremity of such post 22, while the rear portion of such shaft is supported by the bearing 43 carried by the bracket 44 projecting above and operatively connected with the arms 17, such shaft, closely adjacent to the post 22, being provided with a pinion 44 adapted to mesh with a pinion 45 fixed to the post 22, whereby it will be readily perceived that upon axial movement being imparted to the shaft 41 in either direction the post 22 will be caused to correspondingly rotate, which movement will result in the requisite guiding or steering of the machine. To further support the outer end of the shaft 41 in operative position, I find it advisable to employ the yoke 46 having its free extremities loosely engaged with the post 22, as is believed to be clearly disclosed in the accompanying drawings. The inner extremity of the shaft 41 also terminates in close proximity to the seat 38, whereby the operating member 47, herein disclosed as a conventional steering wheel, may be readily and conveniently grasped by the occupant of the seat.

Operatively connected with the forward or lower end of the frame 1 is the digging point or plow 48 adapted to penetrate the soil in order to lift the tubers of the plants, the extent or penetration of such digger or plow 48 being, as is thought to be self-evident in view of the foregoing, under control of the lever 34.

The digger or plow 48 is of such formation that the plants lifted thereby from the soil are caused to be deposited upon the upper stretch of the conveyer 49 operatively supported between the side members 15 of the frame, whereby such lifted plants may be suitably conveyed to the elevator 91 in order that the same may be conveniently deposited within a suitable barge or other vehicle caused to trail or follow the machine in its travel, as is generally done in connection with devices of the same general character as the one in issue. As herein disclosed, the conveyer 49 is also adapted to serve as a separator and, as herein illustrated, comprises the spaced endless linked members 50 disposed around the sprocket wheels 51 and 52, positioned respectively at the lower ends of the members 15 and at the top of the forward inclination thereof, the supporting shaft 53 for the sprockets 52 constituting the driving shaft of my improved agricultural machine, as herein disclosed, and adapted to be operatively connected with a suitable motor 54, to be hereinafter more particularly referred to.

The corresponding links 55 of each of the members 50 are adapted to be tied or connected by the rods 56, such rods being in such proximity one to the other as to effectually prevent the tubers from falling therebetween, but affording suitable spaces whereby dirt or other matter separated from the tubers or plants during their transit may readily and conveniently fall to the ground.

The lifted plants, after being discharged from the conveyer 49 at the rear or substantially horizontal portion of the frame, are adapted to be engaged by the rake mechanism 62 adapted to properly engage the vines or tops and separate the same from the tubers and, as herein disclosed, the rake mechanism 62 comprises the spaced endless linked members 63—63 disposed around the sprockets 64 and 65 positioned, respectively, at the forward and rear extremities of such horizontal portion of the frame 14, corresponding links of the members being united by the rake bars 62$^a$ which may be of any ordinary or preferred construction as will best operate to advantage and the connection of such rods with the respective links may be as desired. The tubers proper, after leaving the conveyer 49, drop within the hopper 66 to be hereinafter more particularly referred to.

As herein disclosed, the rake mechanism 62 is caused to properly travel through the medium of the sprocket chain 67 operatively connected with a sprocket 68 fixed to the driving shaft 53, hereinbefore referred to, and which also passes around the sprocket 69 fixed to a projected end portion of the shaft 70 of the sprockets 65 of the rake mechanism, adjacent the rear or tail of the frame 14. Coacting with the rake mechanism is the beater 71, herein shown as comprising a plurality of blades 72 operatively connected to the shaft 73 rotatably supported by the side sections 15 and disposed therebetween and positioned to the rear of the rake mechanism and in close proximity thereto, the requisite rotary movement being imparted, as herein set forth, to the beater 71 through the medium of the sprocket chain 74 passing around the sprocket 75 fixed to the shaft 53 and also directed around the sprocket 76 operatively connected with the shaft 73 of the beater 71.

Suitably connected with the frame 14 and positioned therebelow and to one side thereof is the auxiliary frame or bed 77 of requisite dimensions and on which is suitably mounted, preferably adjacent the forward end thereof, the motor 54 of any conventional type but preferably an internal combustion engine, the style of engine herein illustrated being of the well known Galloway type. As herein set forth, the crank shaft 79 of the engine is provided with a sprocket 80 around which passes a sprocket chain 81 also directed around the sprocket wheel 82 loosely mounted on the shaft 53 but provided with a clutch face 83 adapted to coact with the sliding clutch member 84 keyed to the shaft 53 in such a manner as to be capable of movement endwise thereof but to rotate therewith, whereby it will be readily perceived that when such sliding clutch member 84 is caused to engage the clutch face 83 of the sprocket 82, the various movable parts of my improved machine will be caused to operate, as is believed to be self-evident.

While any means may be employed that will operate with facility for imparting the requisite movement to the sliding clutch member 84 upon the shaft 53, I find it of advantage to use the arrangement herein set forth and wherein the member 84 is operatively engaged by the clutch lever 85 suitably pivoted intermediate its length, as at 86, and having an extremity in pivotal engagement with the drag link 87 operatively connected with the suitably supported lever 88, whereby a convenient and effective control of the slide member 84 may be had, it being understood that the lever 88 is positioned in such proximity to the seat 38 as to be in convenient reach of the occupant.

Projecting upwardly from a side member 15 of the frame 14 and adjacent the tail or rear thereof are the posts 89 of predetermined height, to the upper extremities of which are adapted to be suitably secured the supporting or brace rods 90 for the upper portion of the elevator 91, which elevator is adapted to convey the tubers deposited within the hopper 66 to a barge or other suitable vehicle traveling with or trailing my improved machine and in order that the possibility of injury, resulting from such barge or other vehicle contacting with a vehicle, may be reduced to a minimum. I prefer to have the rods 90 capable of endwise movement through the posts 89, the upper or free extremities of such rods 90 being provided with suitable abutments 92 and between such abutments 92 and the adjacent faces of the posts 89 are the tension springs 93 operating in a manner which is believed to be self-evident.

As herein disclosed, the lower face of the hopper 66 is open and the endless carrier 94 comprised in the elevator mechanism 91 is adapted to pass therebeneath in order to properly receive the tubers delivered within the hopper.

As herein embodied, the conveyer 94 comprised in the elevator mechanism includes the spaced linked members 96—96 passing around the sprocket wheels 97 operatively supported by the lower portion of the hopper 66 and the sprockets 98 suitably mounted in the side members of the elevator mechanism. The corresponding links of each of the members 96 are tied or connected by the cross rods 100 of substantially the identical construction as the links 55, hereinbefore referred to, except at spaced intervals, such as every eighth link, whereupon the link 101 has its outermost bar provided with the laterally directed flat extension 102 affording a convenient means whereby engagement may be had with an extremity of the bucket bar 103, herein shown as substantially L-shaped in cross section.

While any means may be employed for imparting the requisite movement to the carrier 94, included in the elevator mechanism 91, I prefer to employ the arrangement disclosed in the accompanying drawings, wherein the shaft 105, on which the uppermost sprockets 98 are mounted, has affixed to a projected end portion thereof a sprocket 106 operatively engaged with a chain 107 also directed around a sprocket 109 fixed upon a shaft 110, herein shown as rotatably supported, as at 111, by the main frame 112 of the elevator mechanism 91. The opposite extremity of the shaft 110 is provided with a beveled pinion 114 operatively connected with a correspondingly beveled pinion 115 fixed on the shaft 116 rotatably supported by the main frame 112 and a post 89, the innermost extremity of such shaft having fixed thereto a sprocket 117 operatively engaged by the chain 118 passing around a sprocket 119, suitably fixed to the shaft 53, hereinbefore referred to. In order to maintain the proper tension upon the chain 107, I employ the suitable tensioning or tightening means herein disclosed as rotatably supported rollers adapted to contact with each of the stretches of the chain 107 at a point thereabove, such rollers 119ᵃ being mounted upon the rod 120, the lower extremity of which is pivotally connected, as at 121, to the shear levers 122 assembled and operating in a manner which is believed to be clearly apparent to those skilled in the art to which my present invention appertains.

In order to protect or guard the upper portion of the elevator mechanism, or more particularly the conveyer included therein, I find it of advantage to have the side members 108 of the conveyer 54, comprised in the elevator mechanism 91, curved downwardly and rearwardly at the uppermost end a suitable distance so as to form the guide 123, such guide serving to prevent the conveyer chains 96 from coming into contact with the wagon box or barge following or trailing my improved machine. I also find it of advantage to have the lower stretch of the conveyer 49, or more particularly the linked members 50 included therein, directed over the sprockets 124 whereby such conveyer is prevented from sagging, as would otherwise tend to impair the efficiency of the machine and I suitably mount in the side members 15, idler sprockets 124 over which the linked members 50 are adapted to travel which is believed to be self-evident.

When it is desired to propel my improved machine from the motor 54, hereinbefore referred to, and as is particularly illustrated in Fig. 7, I suitably fix on the shaft 53 a gear wheel 125 adapted to mesh with the gear 126 produced on a face of the sprocket wheel 127 rotatably mounted on the sliding bearing block 128, whereby such gears 125 and 126 may be brought into or out of mesh as the occasion requires and, as herein disclosed, the bearing block 128 is capable of reciprocal movement in the guide-way 129, while the forward extremity of the block 128 is operatively connected, as at 95, with the lower extremity of the lever 130, such lever having its upper extremity terminating in close proximity to the seat 38 whereby such block may be readily and conveniently adjusted by the occupant. The lever 130 is provided with a latch 131 adapted to coact with the rack 132 whereby such lever may be locked in its various adjustments, whereby it is assured that the gears 125 and 126 are maintained either in or out of mesh as the occasion requires.

Operatively connected with the sprocket 127 is the chain 133 which is adapted to pass around the sprocket 134 operatively connected with one of the traction wheels 9. It is thought to be self-evident that, should the occasion require that each of the wheels 9 be operatively connected with the motor, it will only be necessary to duplicate the structure just recited.

While it is believed to be self-evident, it may be well to state that the sprockets 51, 64, 97 and 124, hereinbefore referred to, are mounted on stub shafts in a manner also substantially similar to that which has been described with reference to the wheels 9. This is done in order that resultant friction may be reduced to a minimum. I also find it of particular advantage to provide an antifriction mounting for the several shafts, comprised in my improved machine, but it is believed that an illustration and description of the mounting of the shaft 53 in one of the side frames 15 is sufficient as the remaining mountings are substantially identical. As is particularly shown in Fig. 5, it is to be observed that that portion of the shaft which is directed through one of the side boards 15 is surrounded by a sleeve 140 provided with an annular flange 141 midway its length which is adapted to be connected as disclosed by 142 with the side board or frame 15. Operatively positioned within the sleeve are the roller bearings 143 which are adapted to contact with the shaft 53 and thus serve to reduce to a minimum any resultant friction. I also find it of advantage to employ in connection with the sleeve 140 suitable means whereby the shaft 53 may be maintained against endwise movement and, as herein disclosed, I accomplish this result through the medium of the clamping members 148, of conventional form, adapted to straddle the annular flanges 149 produced adjacent the opposite extremities of the sleeve 140, the construction of the clamping members 148 being such as to be readily applied to or removed from the shaft 53. I also find it of advantage to provide the sleeve 140 at opposite sides of the board or frame 15 with the lubricating cups 150 in suitable communication with the interior of the sleeve 140, for purposes which are believed to be self-evident.

From the foregoing description, it is thought to be obvious that an agricultural machine constructed in accordance with my invention is of an extremely simple and comparatively inexpensive nature and is particularly well adapted for use by reason of the convenience and facility with which it may perform the functions thereof and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

Having thus fully described my invention what I desire to claim and secure by Letters Patent, is:

A device of the character described including a main frame comprising spaced side sections having their forward portions disposed on a downward incline while the rear portions thereof are disposed substantially horizontally, a wheeled support for such frame positioned below the forward inclined portion thereof, a plurality of conveyers operatively mounted upon the frame, a driving shaft, operable connections between the driving shaft and the conveyers, an auxiliary frame depending from a side member of the first mentioned frame and positioned to one side of the first mentioned frame, said auxiliary frame extending in substantially a horizontal plane and beyond the opposite sides of the supporting axle and extending outwardly from the side member beyond the adjacent supporting wheel, a source of power carried by the auxiliary frame in advance of the supporting axle and beyond the adjacent supporting wheel, and a controllable connection between the source of power and the driving shaft, one of the conveyers extending laterally of the device and in a direction away from the auxiliary frame and on an upward incline.

In testimony whereof I hereunto affix my signature in the presence of two witnesses.

FRED C. BLAIR.

Witnesses:
F. B. REINKING,
B. H. REINKING.

Copies of this patent may be obtained for five cents each, by addressing the "Commissioner of Patents, Washington, D. C."